United States Patent Office 3,159,685
Patented Dec. 1, 1964

3,159,685
SEPARATION OF PHENOLS
Kenneth B. Bradley, Midland, and Howard J. Klopf, Bay City, Mich., assignors to The Dow Chemical Company, Midland, Mich., a corporation of Delaware
No Drawing. Filed May 29, 1961, Ser. No. 113,148
5 Claims. (Cl. 260—619)

This invention relates to a new process for separating phenols which are not easily separable by conventional methods. More particularly, it relates to a method whereby ortho halogenated phenols are efficiently separated from their mixtures with phenols not having an ortho halogen substituent.

Mixtures of phenols are usually separated and purified either by fractional distillation or by fractional crystallization. Separation of phenols by fractional crystallization is ordinarily limited to normally solid phenols and the process is often too slow and cumbersome to be of commercial importance. Such separation may also be rendered difficult or impossible by the formation of mixed crystals. Fractional distillation is the method usually employed to isolate or purify one or more of the components of phenolic mixtures. For a number of commonly occurring phenol mixtures, however, this method fails to give satisfactory separation because of close boiling points or because of the formation of azeotropic mixtures. Examples of common binary mixtures which are difficult or impossible to separate for these reasons are phenol and o-bromophenol, phenol and o-chlorophenol, p-chlorophenol and 2,4-dichlorophenol, and p-bromophenol and 2,4-dibromophenol.

It has now been found that such mixtures where there is present an ortho halogenated phenol and a phenol not having an ortho halogen substituent are easily and efficiently separated into their components by a preferential sulfonation process. When a mixture comprising an ortho halogenated phenol and a phenol with no ortho halogen substituent is sulfonated in the liquid phase at moderate temperatures, the phenol having no ortho halogen is sulfonated to the essential exclusion of the ortho halogenated phenol. The sulfonated and unsulfonated phenols are then easily separated, for example, by distillation of the unsulfonated phenol from the mixture or by a solvent separation procedure. In some cases where it is desired to carry out another reaction with the unsulfonated phenol, it may not be necessary to separate the sulfonated and unsulfonated phenols if the sulfonated phenol is thereby rendered inert in the further reaction.

The phenols separable by this process are mixtures of phenols of the general formula:

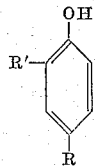

wherein R is an inert substituent such as hydrogen, halogen, alkyl containing 1–12 carbon atoms inclusive, aralkyl, or aryl, and R' is hydrogen or alkyl containing 1–12 carbon atoms inclusive with the ortho monohalogenated derivatives of these phenols, which derivatives are represented by the general formula:

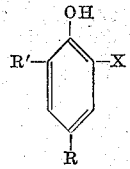

wherein R and R' are as defined above and X is halogen and may be fluorine, chlorine, bromine, or iodine. The term phenol as used in this specification means monohydric phenols of the benzene series.

By halogen is meant any of the halogens, that is, fluorine, chlorine, bromine, and iodine. This process is directed mainly to the separation of ortho brominated and ortho chlorinated phenols from phenols having no ortho halogen, since difficult separation problems most commonly arise in such cases. However, the process may also be used with fluorophenols and iodophenols although in the case of iodophenols, separation of the sulfonated phenol from the unsulfonated material is usually by solvent extraction or fractional crystallization rather than by distillation to avoid decomposition.

Any of the common sulfonating agents may be used in the process. Chlorosulfonic acid is usually most convenient although sulfur trioxide, concentrated sulfuric acid, or fuming sulfuric acid will yield as good results. To ensure sulfonation of all of the phenol not having an ortho halogen, it is necessary to use at least a molar equivalent of the sulfonating agent. Use of 1.0 to 1.3 moles of chlorosulfonic acid or sulfur trioxide per mole of such phenol has been found satisfactory, but about 2–4 moles of concentrated sulfuric acid is preferred.

The temperature suitable for the sulfonation reaction is conventional and may be from about or somewhat below normal room temperature up to about the boiling point of the phenol mixture. It is preferred to sulfonate at about 20–65° C. and in the case of phenols which are unstable at higher temperatures, particularly in the presence of a strong acid, it may be necessary to operate within this lower range to avoid decomposition or rearrangement.

The sulfonation is often best carried out with the phenol mixture dissolved in an inert solvent, particularly when there is a large amount of phenol to be sulfonated or when the phenols are solids. Solvents of relatively high density facilitate the separation of a solvent-phenol layer from an aqueous sulfonic acid layer at the end of the sulfonation reaction and are preferred for this reason. Where desirable, the solvent may be added to the reaction mixture after the sulfonation. Suitable solvents are inert chlorinated hydrocarbons, for example, carbon tetrachloride, perchloroethylene, methylchloroform, ethylene dilchloride, and dichlorobenzene. By inert is meant unreactive in the sulfonation process.

The sulfonated portion of the reaction mixture may be recovered and the phenol regenerated by cleaving the phenol-sulfonic acid with water at elevated temperatures, for example, simply by a steam distillation or by heating the sulfonic acid with water, preferably acidified, under pressure.

A typical procedure for purifying an ortho-halophenol containing as an impurity a small amount of a phenol with no ortho halogen includes contacting the impure ortho-halophenol with about 1.0–1.3 moles of chlorosulfonic acid per mole of phenolic impurity at about 20–65° C. for a time sufficient to complete the sulfonation. The reaction mixture is then preferably neutralized by adding an alkali such as sodium hydroxide or potassium hydroxide and the mixture is then distilled to obtain the pure ortho-halophenol, the alkali salt of the sulfonic acid of the contaminating phenol remaining in the reactor as distillation residue.

A preferred procedure for separating an ortho-halophenol from a relatively large proportion of a phenol having no ortho halogen substituent involves carrying out the sulfonation of the phenol with no ortho halogen as described above except that the phenol mixture is dissolved in about 1–3 times its volume of a chlorinated hydrocarbon solvent. When the sulfonation reaction is complete, a volume of water at least sufficient to dissolve the sulfonated phenol is added to the mixture whereupon two layers are formed, the upper aqueous layer containing the sulfonic acid of the phenol having no ortho halogen and any excess sulfonating acid, and the lower solvent layer containing the unchanged o-halophenol. After separation of the two layers, the solvent layer is distilled to recover the o-halophenol, preferably after neutralizing any remaining traces of acid. The aqueous layer is steam distilled to cleave the sulfonic acid, adding water or steam as necessary to complete the process, and thereby recovering the phenol having no ortho halogen.

The following examples illustrate different methods of using our invention depending upon the phenols involved and their relative proportion.

*Example 1*

A reaction flask equipped with a stirrer and a thermometer was loaded with 1285 g. of o-chlorophenol which contained 2.0% by weight of phenol. To the stirred mixture there was added dropwise 24 grams of sulfur trioxide at a temperature of 26–28° C. The reaction mixture was stirred for 15 minutes after the addition and then the acid present was neutralized by adding 25 g. of 50% NaOH solution. The reaction mixture was then distilled at atmospheric pressure through a small Vigreux column to a take-off head temperature of 175° C. to remove water from the system. The distillate also contained 36 g. of o-chlorophenol. The distillation was continued at 25 mm. pressure until the pot contained only solid residue. The main distillate amounted to 1192 g. of o-chlorophenol which contained less than 0.2% phenol by weight by infrared analysis.

*Example 2*

A solution of 200 grams of an azeotropic mixture composed of 70% by weight of o-bromophenol and 30% by weight of phenol in 400 cc. of carbon tetrachloride was put in a reaction flask equipped with stirrer, thermometer, and reflux condenser. To the stirred solution there as added dropwise 82 grams of chlorosulfonic acid at 38–42° C. over a period of 80 minutes. The reaction mixture was stirred an additional hour, after which 300 cc. cold water was added while maintaining the temperature of the mixture below 40° C. The solvent layer was separated from the resulting mixture and neutralized by addition of 5 grams of sodium bicarbonate. It was distilled at atmospheric pressure through a small Vigreux column to remove carbon tetrachloride, and the residue was then distilled at 25 mm. pressure to obtain 119 g. of o-bromophenol which contained less than 0.5% by weight of phenol by infrared analysis.

*Example 3*

A freshly monochlorinated solution of 2 g. moles of p-phenylphenol in 500 cc. of o-dichlorobenzene contained 1.3% by weight of p-phenylphenol based on the weight of solution. To this solution was added 11.6 g. of chlorosulfonic acid at about 60° C. and the solution was stirred for 30 minutes. The solution was neutralized by adding 8 g. of 50% NaOH solution and then distilled. The main fraction amounted to 337 grams which assayed 2.5% by weight of dichloro-p-phenylphenol and less than 0.2% p-phenylphenol, the remainder being 2-chloro-4-phenylphenol. Elimination of the sulfonation step from the above procedure results in a final product assaying about 91% 2-chloro-4-phenylphenol.

*Example 4*

A quantity of 248 g. of a chlorinated phenol mixture composed of 80% by weight of 2,4-dichlorophenol and 20% by weight of p-chlorophenol was dissolved in 400 cc. of perchloroethylene in a one liter flask fitted with a stirrer and a thermometer. To this solution there was added 190 cc. of 96% sulfuric acid and the mixture was stirred for 80 minutes at room temperature. The acid layer and the solvent layer were then separated and the acid layer was washed once with 50 cc. of perchloroethylene. The combined solvent layer and percholorethylene wash was distilled to yield as the main fraction 172 g. of 2,4-dichlorophenol of freezing point 42.28° C. and containing less than 0.5% by weight of p-chlorophenol by infrared analysis.

The acid layer from the above separation was diluted with 200 cc. of water and heated to 150° C. The volatiles were condensed and the pot temperature was maintained at about 150° C. while water was added dropwise while stirring for 6 hours. The organic layer was then separated from the distillate. It amounted to 45 grams and infrared analysis indicated it was 93% by weight p-chlorophenol, the remainder being 2,4-dichlorophenol.

*Example 5*

A one liter reaction flask was charged with 328 g. of a mixture consisting of 5.6% by weight of p-tert-butylphenol, 2.0% 2-tert-butyl-6-chlorophenol, and the remainder 4-tert-buty-2-chlorophenol. Chlorosulfonic acid in the amount of 17.5 grams was stirred into the mixture at room temperature, the maximum temperature reached being 31° C. One hour after the addition of the acid, 500 cc. of perchloroethylene and then 100 cc. of water were added to the mixture, the whole was shaken together and the layers were allowed to separate. The solvent layer was separated and combined with a 25 cc. perchloroethylene wash of the acid layer. A small amount of sodium bicarbonate was added to the solvent layer to neutralize any traces of acid which might be present and the solution was then distilled to obtain 290.5 g. of 4-tert-butyl-2-chlorophenol which contained as impurities 2% by weight of 2-tert-butyl-6-chlorophenol and less than 0.2% by weight of p-tert-butylphenol.

Combinations of several phenols may be separated by our process. For example, a mixture of o-chlorophenol and 4-tert-butyl-2-chlorophenol which contains 1–2 wt. % each of phenol and p-tert-butylphenol may be sulfonated as described in Example 1 or Example 5 to remove the two minor contaminants and the o-chlorophenol and 4-tert-butyl-2-chlorophenol are then easily obtained as pure compounds by fractional distillation.

We claim:

1. A process for separating phenols of the general formula

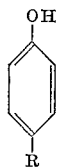

wherein R is selected from the group consisting of hydrogen, halogen, alkyl of 1–12 carbon atoms, aralkyl, and aryl from mixtures thereof with the ortho monohalogenated derivatives of these phenols, which process comprises contacting said mixtures in the liquid phase at a temperature up to about the normal boiling point of the phenol mixture with a quantity of sulfonating agent sufficient to sulfonate essentially all of the phenol not having an ortho halogen substituent, thereby preferentially sulfonating substantially all of the phenol not having an ortho halogen substituent, and separating ortho monohalogenated phenol from the sulfonated mixture.

2. The process of claim 1 wherein the sulfonation reaction is carried out in an inert chlorinated hydrocarbon solvent solution.

3. The process of claim 1 wherein the sulfonation temperature is about 20–65° C.

4. A process for separating phenols of the general formula

wherein R is selected from the group consisting of hydrogen, halogen, alkyl of 1–12 carbon atoms, aralkyl, and aryl from mixtures thereof with the ortho monohalogenated derivatives of these phenols, which process comprises contacting said mixtures in the liquid phase at about 20–65° C. with a quantity of sulfonating agent sufficient to sulfonate essentially all of the phenol not having an ortho halogen substituent, thereby preferentially sulfonating substantially all of said phenol not having an ortho halogen substituent, and distilling said ortho monohalogenated phenol from the sulfonated mixture.

5. A process for separating phenols of the general formula

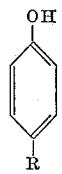

wherein R is selected from the group consisting of hydrogen, halogen, alkyl of 1–12 carbon atoms, aralkyl, and aryl from mixtures thereof with the ortho monohalogenated derivatives of these phenols, which process comprises forming a solution of said mixture in a chlorinated hydrocarbon solvent, contacting said solution with a quantity of sulfonating agent sufficient to sulfonate essentially all of the phenol not having an ortho halogen substituent at a temperature of about 20–65° C., thereby sulfonating substantially all of said phenol not having an ortho halogen substituent, adding to the sulfonated mixture a volume of water sufficient to dissolve the sulfonated phenol, and separating the thereby formed aqueous and solvent layers.

References Cited in the file of this patent
UNITED STATES PATENTS
2,370,719    Benedictis _____ Mar. 6, 1945
OTHER REFERENCES
Fieser and Fieser, Organic Chemistry, 1950, p. 595.